United States Patent [19]

Ropp

[11] 4,126,665

[45] * Nov. 21, 1978

[54] PREPARATION OF POLYMERIC ALKALINE EARTH METAPHOSPHATE GLASSES

[75] Inventor: Richard C. Ropp, Warren, N.J.

[73] Assignee: Allied Chemical Corporation, Morris Township, Morris County, N.J.

[*] Notice: The portion of the term of this patent subsequent to Sep. 20, 1994, has been disclaimed.

[21] Appl. No.: 694,752

[22] Filed: Jun. 10, 1976

[51] Int. Cl.$^2$ .................. C01B 15/16; C01B 25/26; C03C 3/00; C03C 5/00

[52] U.S. Cl. .................. 423/314; 423/305; 106/47 R

[58] Field of Search ............ 423/305, 309, 313, 314, 423/315; 106/47 R, 47 P, 47 B; 23/300, 305 R, 305 A, 305 F

[56] References Cited

U.S. PATENT DOCUMENTS

| 2,434,281 | 1/1948 | Moulton | 106/47 |
|---|---|---|---|
| 3,384,453 | 5/1968 | Kauders | 423/309 |

FOREIGN PATENT DOCUMENTS

| 449,983 | 7/1948 | Canada | 423/305 |
|---|---|---|---|
| 504,835 | 9/1954 | Canada | 423/305 |
| 270,820 | 5/1927 | United Kingdom | 423/309 |

Primary Examiner—O. R. Vertiz
Assistant Examiner—Gregory A. Heller
Attorney, Agent, or Firm—Arthur J. Plantamura; Ernest A. Polin

[57] ABSTRACT

Polymeric metaphosphate glasses, $[M(PO_3)_b]_n$, having chemical durabilities at least 40–400 times greater than those of the prior art are provided. In the formula, M is selected from the group consisting of Al, Be, Mg, Ca, Sr, Ba, Cd and Zn, and "b" has a value of 3 for Al and 2 for the other cations. The high durabilities of the glasses are achieved by controlled preparation of the precursor compounds in specific stoichiometric proportion, by heating the precursors in a controlled thermal cycle to induce preliminary polymerization of the intermediates, by thereafter melting said intermediates, and by subsequently holding said melt for a time to complete the polymerization. The melt is then cast to form the glass which is then annealed in the normal manner.

The disclosure involves in particular single high purity compound precursors which form single phase glasses. Each system is subject to mutual phase separation if mixtures are used; even impurities become segregated because each single-phase-glass system rejects said impurities during polymerization. Single phases are necessary because mixtures of glass phases are found to be less stable than the single phase glass of the present invention and cannot be prepared free from striae for use in optical or other applications.

12 Claims, No Drawings

PREPARATION OF POLYMERIC ALKALINE EARTH METAPHOSPHATE GLASSES

CROSS REFERENCE TO RELATED APPLICATION

The present application is related to subject matter disclosed in my prior copending applications Ser. No. 633,776, filed Nov. 20, 1975 now abandoned, entitled "Glasses Prepared by the Melting of Stoichiometric Compounds"; and Ser. No. 644,270, filed Dec. 24, 1975, entitled "Crystalline Salt Monomers for Stable Phosphate Glasses" now U.S. Pat. No. 4,049,779.

BACKGROUND OF THE INVENTION

Attempts to make phosphate glasses in a chemically stable form by methods employed in the prior art have been largely unsuccessful. Typical of such prior art systems in which phosphates are employed are those processes set forth in U.S. Pat. Nos. 2,434,281; 2,031,579; 2,064,344 and 3,485,646. The compositions utilized in those patents include $P_2O_5$ or $H_3PO_4$ or $HPO_3$. Compounds which decompose to the oxide to form a compound such as $NaPO_3$ and $Al(PO_3)_3$ have also been prepared from $HPO_3$ which are then used to prepare the glass. However, the prior art techniques do not recognize the criticality in obtaining a glass product of desired properties by preparing precursor compounds, to be melted to form the glass, in essentially pure stoichiometric monobasic form prior to melting the compounds. Also, no known prior art system appears to recognize the criticality of reacting the precursor monobasic compounds in a thermal process to obtain a melt which is further reacted to form stable phosphate glasses when appropriately cast and annealed. Moreover, there is no recognition in the prior art of the importance of restricting the glass composition to a single phase in order to achieve complete polymerization with consequent high resistance to hydrolysis in boiling water.

SUMMARY OF THE INVENTION

In accordance with the invention, phosphate glasses are obtained by first preparing monobasic phosphate precursor compounds of stoichiometric equivalent substantially free of phosphoric acid and impurities and then using these precursors to form the melt for the desired glass. The precursor compounds within the scope of the invention are represented by the formula:

$$M(H_2PO_4)_b$$

where M is a single metal selected from the group consisting of Al, Be, Mg, Ca, Sr, Ba, Cd and Zn and where "b" is 3 for Al and 2 for the other cations. Depending on the particular precursor, it may, or may not, contain waters of hydration.

In the preparation of the precursors of the invention a recrystallization from solution is employed both to obtain purification and high crystallinity. The reagent of choice in the preparation of these salts is $H_3PO_4$. The cation, in the form of oxide, hydroxide, or carbonate, is dissolved in dilute $H_3PO_4$. Once dissolution is obtained, the solution is purified by suitable means such as precipitation of impurities by the addition of organic complexing agents including ammonium 1-pyrrolidinedithiocarbamate. A suitable alternate is cupferron. The solution is filtered and further purified by mercury-pool electrolysis. The solution is then evaporated to obtain monomer crystals. These crystals are then washed thoroughly in acetone to remove all traces of phosphoric acid and are then dried. The crystals are then placed in a furnace and heated to cause initial polymerization and to form a melt. The heating process must be continuous and cannot be interrupted at any point before or after the melt has formed. The melt is maintained at a temperature about 100° C. over the minimum temperature required to form the melt e.g., for calcium the temperature is 1050° C.; for magnesium, it is 1200° C. The melt is held for a time to ensure complete polymerization, usually in the order of about 96 hours to about 120 hours. Longer times are not destructive to the melt but neither are they productive. At the end of the hold-time, the melt is then cast and annealed. For optical quality glass, the melt must be stirred to ensure homogeneity, e.g., stirring by helium gas bubbling is a suitable method. The melt must then be cast in a hot mold to obtain glass completely free from striae.

DESCRIPTION OF THE PREFERRED EMBODIMENTS

One of the major properties adversely affecting the commerical usage of the non-silicate glasses is chemical durability. Chemical durability of a glass is usually defined in terms of the rate of chemical etching of the surface by a liquid such as boiling water. A convenient reference is the durability or weight loss of plate glass (soda lime silicate) in boiling water which is 0.053 mg/cm$^2$/hr. I have discovered, for example, that phosphate glasses prepared according to the present invention exhibit marked improvement in chemical durability and rival those of the silicate-based glasses. This is a highly significant order of change in the chemical durability of phosphate glasses which has not been achieved heretofore. For example, the prior art quotes durabilities for phosphate glasses ranging from 2.2 to 83 mg/cm$^2$/hr. For a calcium phosphate glass prepared according to the invention, I have achieved a durability of 0.11 mg/cm$^2$/hr while an aluminum phosphate glass prepared according to the invention showed a durability of 0.000054 mg/cm$^2$/hr. Magnesium phosphate glass exhibits a durability of 0.084 mg/cm$^2$/hr. Strontium phosphate glass shows a durability of 0.23 mg/cm$^2$/hr whereas barium phosphate glass has a chemical durability of 0.093 mg/cm$^2$/hr. These values are improved generally in the order of at least forty to as much as a thousand times over the durabilities of the prior art.

In accordance with the invention I have found that, for non-silicate glasses such as those based upon phosphates, it is desirable to form a stoichiometric compound, i.e. a precursor of specific proportions, which substantially freed of phosphoric acid and impurities and then used to form the melt to produce the desired glass. The resulting glass thereby exhibits properties not normally found for similar glasses of melts prepared otherwise. Glass thus prepared is useful in a variety of applications such as face plates for electronic display devices, as fiber optics, as optical lenses and other optical pieces and the like.

It must be appreciated that a chemically durable phosphate glass can only be achieved by limiting the glass composition to a single phase. Such glass composition may be described by the metaphosphate formula:

$$[M(PO_3)_b]_n$$

where M is a cation selected from the group consisting of Al, Be, Mg, Ca, Sr, Ba, Cd and Zn, "n" denotes a degree of polymerization and has a value of at least 4 and "b" has a value of 3 for Al and 2 for the other cations. In nearly all cases in the prior art it is common to make various mixtures of cations in order to improve the chemical durability of the obtained glass. However, such prior art durabilities do not approach the durabilities achieved in the present invention.

I have found that a melt-rejection mechanism is present during the polymerization stages of the melt and that each specific composition, such as $[Ca(PO_3)_2]_n$ or $[Mg(PO_3)_2]_n$, form melts which are mutually axclusive so that separate glass phases result at the end of the polymerization process. This results in phase-separated glass with internal striae present. Glass with such striae is not useful in optical applications. I have further discovered that any impurities present in the glass melt become segregated and consequently become major contributors to a product lacking in chemical durability. When such impurities are present it is found that hydrolysis occurs at the points where the impurities are localized although the base glass itself does not appear to be attacked appreciably by the hydrolytic etching.

I have further determined that the most durable glass is that one which is exactly stoichiometric as the metaphosphate composition. This result appears to be specifically contrary to prior art wherein it is considered that the metaphosphate composition is the least stable; those with excess phosphate or with excess metal cation being considered appreciably more stable to hydrolysis etching than the metaphosphate composition itself. Thus, it appears that the factors which contribute to the unique high chemical durabilities (extremely low hydrolysis etching) found for glasses of the present invention are:

1. the use of a single phase glass composition,
2. obtaining a high degree of purity in the salt precursor to minimize impurity segregation in the melt with consequent increased resistance to hydrolysis etching,
3. maintaining the melt composition exactly at the metaphosphate formulation,
4. choosing a proper crucible material to hold the melt,
5. preheating the salt precursor in a controlled manner to initiate polymerization prior to melting,
6. continued heating to form a melt,
7. holding the melt for a time sufficient to complete the polymerization of the melt (usually about 96 to about 120 hours), and
8. casting the melt in a heated mold (300° ± 10° C. in graphite or lava, 110° ± 10° C. in stainless steel) if an optical quality glass is desired.

The glass casting is then annealed according to a predetermined annealing program. The melt must be stirred to obtain optical quality glass. Bubbling helium gas, or oxygen gas, through the melt is a suitable method. However, air or nitrogen should be avoided because I have found that such bubbles introduced into the melt cannot be easily dispersed. Also, reducing atmospherees degrade the melt and the resulting glass is less stable to hydrolytic etching by boiling water. The present invention is essence utilizes a single selected precursor compound of stoichiometric proportion which is melted to form a glass. Such precursors consistent with the invention are those having the formula:

wherein M is one of the metal ions selected from the group consisting of Al, Zn, Cd, and the alkaline earth metals Be, Mg, Ca, Sr and Ba and wherein n has a value of 2 or 3 depending on whether M is a divalent or trivalent ion. Furthermore, the metal monobasic phosphate selected from this group must be purified to remove the impurity metal ions to a purity level superior to reagent grade of 5000–9000 ppm and preferably having no more than about 100 ppm total impurities. Impurity metal ions include metals other than M given above such as alkali metal ions e.g., Na, K, Li, the transition metal ions, e.g., Fe, Co, Ni, Cr, V, etc. and the so-called heavy metal ions, e.g., N, Mo, Ta, Au, etc.

A suitable method of purification is as follows. The selected cation as the carbonate, $MCO_3$, or the hydroxide, $M(OH)_2$, is dissolved in a controlled excess of $H_3PO_4$. The resulting solution is suitably filtered such as through a 0.45 micron filter to remove particulate impurities. Ten grams of suitable pecipitant, e.g., ammonium 1-pyrrolidinedithio-carbamate (APC) are weighed out dissolved in 50 ml of water, and added to about 4 liters of the solution. A precipitate forms which is removed by filtration through the 0.45 micron filter.

The steps in the preparation of a typical compound suitable for preparing a phosphate glass of improved properties over those of the prior art, in accordance with the invention, are set forth in my copending application, Ser. No. 644,270, filed Dec. 24, 1975. Once the salt precursor has been obtained, it will still contain small quantities of $H_3PO_4$. I have determined that even a very small fraction of $H_3PO_4$ present in the salt precursor changes the solid state reactions which occur and the resulting glass is measurably less stable to hydrolysis etching than a glass made from a pure, dry salt precursor. The desired salt precursor is exactly stoichiometric when prepared according to the method of the invention detailed in said copending application Ser. No. 644,270. The salt precursor reacts to produce an exactly stoichiometric metaphosphate melt. But if $H_3PO_4$ is present as a minor phase, it becomes incorporated into the melt, introducing hydroxyl group into the finished glass. These hydroxyl groups act as deterrants to the polymerization reaction and the resulting glass is strongly attacked by boiling water. $H_3PO_4$ forms a high-boiling eutectic with $H_2O$ (B.P. = 866° C.) and it is difficult, if not impossible, to eliminate the hydroxyl groups from the melt if said eutectic is present. The only alternative appears to be to remove the excess $H_3PO_4$ from the salt precursor prior to the heating procedure.

The problem resolves itself into the fact that both the monomer and the excess $H_3PO_4$ are water soluble. I have found that certain non-aqueous solvents will preferentially dissolve the $H_3PO_4$ leaving a crystalline salt. Such solvents include the following: acetone, methyl ethyl ketone, methyl acetate, ethyl acetate, n-butanol. In general, the ketones, acetates, and higher molecular-weight alcohols are suitable for $H_3PO_4$ dissolution. However, I have determined that for most divalent salt precursors, acetone remains the best washing agent. The excess $H_3PO_4$ is completely removed by appropriate steps in the washing procedure. Acetone is appropriate for Ca, Sr and Ba salt precursors, whereas methyl ethyl ketone is preferred for Al, Be, Mg, Zn and Cd salt precursors as a washing agent to completely remove excess $H_3PO_4$. I have also determined that excess $H_3PO_4$ is critical for the metaphosphate glass compositions of Ca, Sr, Ba, Cd and Zn, whereas it is not essential for Be, Mg or Al. When the monobasic salt precursor reacts, it loses its waters of hydration, forming an anhydrous salt. This precursor salt then reacts to form either of several intermediates. I have found that when $H_3PO_4$ is completely absent, $Ca(H_2PO_4)_2$ reacts to form $Ca_2H_2P_4O_{13}$, a tetrameric ring product containing hydroxyl groups. This then further reacts to form a melt containing hydroxyl groups, substantially having the formula:

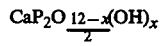

wherein $x$ has a value of at least 2.

As the melt is held at a temperature of the order of about 1050° C., the constituent hydroxyl groups condense to form water and the polymerization reaction proceeds still further. When the hydroxyl groups have been eliminated, the polymerization is complete and a high durability $[Ca(PO_3)_2]_n$ glass results, where $n$ denotes a degree of polymerization of at least about 4. If excess $H_3PO_4$ is present, then the $Ca(H_2PO_4)_2$ monomer reacts in a different manner, to form the initial acid pyrophosphate, to form a melt having a formula;

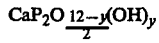

where $y$ is greater than $x$ as given in the first formula and depends on the amount of excess of $H_3PO_4$ present. The resulting glass is much less stable as shown by the data in Table I which also shows the chemical durability of $[Mg(PO_3)_2]_n$ and $[Al(PO_3)_2]_n$ and $[Al(PO_3)_3]_n$ glasses and their lack of criticality to the presence or absence of excess $H_3PO_4$.

TABLE I

| $Ca(PO_3)_2$ Glass | Excess $H_3PO_4$ | Chemical Durability (Loss in mg/cm²/hr) |
|---|---|---|
| (a) Prior Art | not known | ~2.2 to 24.0 |
| (b) Stoichiometric | ~.05% | 0.22 |
| (c) Stoichiometric | +5% | 0.53 |
| (d) Unwashed Crystals | ~25% | 0.63 |
| (e) Stoichiometric | +100% | 2.20 |
| $[Mg(PO_3)_2]_n$ Glass | none | 0.085 |
| $[Mg(PO_3)_2]_n$ Glass | +100% | 0.135 |
| $[Al(PO_3)_3]_n$ Glass | none | 0.000054 |
| $[Al(PO_3)_3]_n$ Glass | +100% | 0.0071 |

This relative instability may be explained as follows. A melt of $Mg(PO_3)_2$ glass is not obtained until the temperature of 1100°–1150° C. is reached. A melt for $Al(PO_3)_3$ is not attained until 1300°–1350° C. At these temperatures, any excess $H_3PO_4$, in the form of the high-boiling (866° C.) eutectic has long since disappeared. Because a melt is obtained at 950°–960° C. for $[Ca(PO_3)_2]_n$ glass, the excess $H_3PO_4$ can be incorporated into the glass. Thus, the chemical durability of $[Ca(PO_3)_2]_n$ glasses are very dependent upon the amount of $H_3PO_4$ present prior to melting to form the glass, as shown above. When a calcium monobasic salt, analyzed by thermogravimetric analysis to contain about 0.05% $H_3PO_4$ by weight, was reacted in an alumina crucible to form a melt and held for 96 hours to effect complete polymerization, the resulting annealed glass showed a chemical durability (hydrolysis loss) of 0.22 mg/cm²/hr. The same salt, in the presence of deliberately added $H_3PO_4$, produced glasses whose hydrolysis loss increased as the initial $H_3PO_4$ increased. Essentially, the same mechanism applies when the cation is Sr, Ba, Cd and Zn.

I have determined that the initial melt of $[Ca(PO_3)_2]_m$ glass transforms slowly over a period of time into another form of the glass:

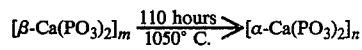

where $m$ and $n$ denote a degree of polymerization and $m<<n$. For full polymerization, about 110 hours at 1050° C. are required for the $Ca(PO_3)_2$ melt whereas 120 hours are required for the $Ba(PO_3)_2$ melt. $\beta$ and $\alpha$ denote different forms of the polymeric glass. Excess cation may be added to the melt in the form of $MCO_3$, $M(OH)_2$ or $MHPO_4$ and $M_2P_2O_7$. The resulting glass is less stable to hydrolysis etching by boiling water by as much as factors of 10. For example, an exactly stoichiometric $Ca(PO_3)_2$ glass has a hydrolysis loss of 0.11 mg/cm²/hr, whereas a glass containing 15 mol% excess calcium, $[\alpha\text{-}Ca_{1.15}(PO_3)_2]_n$, has a hydrolysis loss of 0.86 mg/cm²/hr. Thus, I have established that it is the exact stoichiometric metaphosphate formulation which exhibits maximum resistance to hydrolysis etching in boiling water, in contrast to resistance of glasses of the prior art.

Chemical durability appears to be affected also by the crucible material which may contribute impurities from dissolutions of the crucible. For example, in starting with a $Ca(H_2PO_4)_2 \cdot H_2O$ precursor salt which contains about 50 ppm of impurities, including Fe, Sr, Na, Co, Si, Cr, Mn, K and Li, a glass is made by melting the precursor in a high-purity alumina crucible. Part of the crucible wall is dissolved by the melt and the obtained glass is found to contain about 2200 ppm of impurities of which 1800 ppm is $Al_2O_3$. It is this glass which exhibits a hydrolysis loss of 0.24 mg/cm²/hr. The loss occurs at the places where the 2200 ppm of impurities are isolated and concentrated. The bulk of the glass does not seem to be affected by the boiling water. Crucibles composed of silica zircon ($ZrSiO_4$), gold, and carbon must be avoided completely since these crucible compositions react with the melt and the resulting glass is massively degraded by boiling water. The transition metals are also reactive resulting in a glass which is very vigorously attacked by boiling water. Crucible materials found most suitable are alumina ($Al_2O_3$) and platinum. Although both of these also react with the melt, the reaction is slow enough that these crucible materials are usable. In order to cause the initial polymerization of the salt precursor to proceed, I have found that it is desirable to program the heating from the beginning through a series of stages of sequentially increased temperatures (i.e. in a controlled heating cycle without intermediate temperature decrease) through the melt stage. For the calcium metaphosphate glass precursor, the temperature is programmed at a rate of about 6° per minute to 175° C. where the hydrate water is lost. The temperature is held for 30 minutes and then raised by programming at an increase of 6° C. per minute to 290° C., where it again is held for 30 minutes. The temperature is then programmed to 410° C. where it is held for 30 minutes and then is programmed to 980° C. at a rate of 6° C. per minute where the melt is obtained. Thereafter a final melt temperature of 1050° C. is attained and the melt is held for the prescribed time of about 110 hours. This procedure results in a glass with increased chemical durability over the glass which is obtained through non-programming procedures. The temperatures cited above are specified only for the calcium mono-basic phosphate system. Each cation has its own characteristic reaction temperatures which are similarly determined. I have further discovered that if the heating cycle to initiate polymerization to form the melt is interrupted, and the material is cooled and then reheated to form the melt, the resulting glass is less stable to hydrolysis etching than that glass obtained from a continuous heating schedule. For some applications the product obtained of this stage may be advantageous. The rate of initial heating does not seem to critical and the precursor can be caused to form a melt in as little as one-half an hour or as long as 6 hours without causing an observable change in resistance to hydrolysis etching by boiling water.

The invention will be further described by the following specific examples. It will be understood, however, that although the examples detail certain specific compositions and conditions of the invention, they are provided primarily for purposes of illustration and the invention in its broader aspects is not limited thereto. Unless expressly stated otherwise, parts expressed are parts by weight.

EXAMPLES I-III — Calcium Phosphate Glass (I)

(a) Prepare a solution of $H_3PO_4$ in water by adding approximately 3.00 mols $H_3PO_4$ (210 ml) to 600 ml $H_2O$ and dilute to 1000 ml total volume; 85% $H_3PO_4$ — reagent grade is used.

(b) Weigh out 100.1 gm $CaCO_3$ and slowly dissolve in $H_3PO_4$ solution.

(c) Weigh out 2.5 gm of ammonium 1-pyrrolidinedithio-carbamate (APC) and dissolve in 50 ml of water. Add this solution to the phosphate solution. A dark grey precipitate forms.

(d) Filter the solution through a 0.45 micron filter to remove the precipitate.

(e) The purified solution is evaporated slowly, using a steam bath, if desired, to obtain crystals plus a liquor. The liquor is $H_3PO_4$ plus a small amount of $H_2O$. The excess liquor is decanted and the crystals are washed in acetone, or other suitable solvent by a suspension and decantation procedure to remove all of the excess acid. Even a very small amount of $H_3PO_4$ left in the crystals tends to produce a glass which is not stable to hydrolysis and the excess $H_3PO_4$ must be removed. The resulting crystals have a total impurity content of 100-200 ppm.

(II)

Alternately, if a crystalline salt of higher purity is desired, the following purification procedure is used. Step (a) is followed by step (c) and the resulting solution is filtered as in step (d). Then the $CaCO_3$ is added as in step (b) and steps (c) and (d), are again performed prior to the evaporation step (e). The resulting crystals have a total impurity content of about 100 ppm.

(III)

If an even higher degree of purity is desired, then the procedure of (II) is again followed and the resulting solution is placed in an electrolysis unit equipped with a stirred mercury pool cathode, a gas diffuser for introduction of nitrogen bubbles into the solution, and a platinum anode. The nitrogen gas is turned on and the solution is electrolyzed at −2.75 volts direct current at the mercury pool for a time sufficient to remove ionic metallic impurities. Step (e) is then followed. The resulting crystals have a total impurity content of about 50 ppm.

(f) The crystals of the monobasic salt of (I), (II) and (III) are placed in a clean alumina crucible of suitable size and heated to 1000° C. to cause chemical condensation and polymerization to proceed. The salt decomposes, condenses, and polymerizes to form a clear glassy melt. The melt is held in air for at least 96–110 hours to complete polymerization. The clear glass melt is then cast in desired shapes and processed to relieve internal stress by annealing.

(g) Alternately, the crystals are placed in an alumina crucible and the temperature is programmed through temperature steps corresponding to chemical reactions and condensations as determined by differential thermal analysis. The reaction products are then melted by increasing the temperature to 1050° C. and then processed according to step (f) to cause complete reaction. The programming procedure prior to melting markedly increases the durability of the obtained glass.

EXAMPLE IV—Strontium Phosphate Glass (a) The general steps of Examples I-III are followed except that in the case of strontium phosphate glass, 147.63 gm $SrCO_3$ are substituted for the $CaCO_3$ in step (b) of the prior examples.

(b) Following the evaporation procedure of step (e) in Examples I-III the excess liquor is poured out and the crystals are washed in acetone by suspension and decantation until the excess phosphoric acid is removed.

(c) Depending upon degree of purity desired, any of the purification procedures of Examples I-III can be used.

(d) The general procedures of steps (f) and (g) of the prior examples are then followed to prepare a strontium phosphate glass of high chemical durability, as compared to those glasses of the prior art.

EXAMPLE V — Barium Phosphate Glass (a) The general procedures of Example IV are followed except that 197.35 gm $BaCO_3$ are substituted for the $SrCO_3$ of step (b) of that example.

(b) Following the evaporation step, the crystals are washed in acetone to remove excess phosphoric acid.

(c) The crystals are then melted according to the procedures of the prior examples to form a substantially homogeneous melt which is allowed to undergo condensation and/or polymerization until reaction is complete.

(d) For the barium phosphate salt, the temperatures of reaction are lower than those of calcium phosphate salt and the melt is obtained at a lower temperature of about 925° C. Care must be exercised not to allow the melt temperature to rise over about 1200° C., since phosphorous in the melt is lost as volatile $P_2O_5$, thereby degrading the quality of the so-obtained glass.

EXAMPLE VI — Magnesium Phosphate Glass (a) The general procedures of Examples I-III are followed except that in step (b), 84.32 gm of $MgCO_3$ are substituted for the $CaCO_3$.

(b) In following the evaporation procedure (e) of Examples I-III, it is found that crystals of magnesium monobasic phosphate trihydrate do not form easily. Therefore, the procedure is modified as follows: The solution obtained from step (d) (Examples I–III) is evaporated on a steam bath until about 80% of the volume is lost. The remaining 20% of the solution is then cooled and placed in a separate container to crystallize. After about 48 hours, the liquid condenses into a solid mass of crystals.

(c) Because the magnesium phosphate salt does not form a homogeneous melt below about 1100° C., it is not necessary to remove excess $H_3PO_4$. During the evaporation process, the excess phosphoric acid forms an eutectic compound of $7H_3PO_4.3H_2O$ which boils at about 866° C.

For the case of calcium phosphate glass which melts at about 935° C., a substantial amount of the eutectic compound remains at the 935° C. melting point and is incorporated into the glassy melt.

For the case of the magnesium phosphate glass, all of the eutectic can be boiled off before the glass melt obtains. Therefore, it is not necessary to remove the excess $H_3PO_4$ prior to the condensation and melting procedure to obtain a substantially homogeneous melt. Therefore, the crystals plus liquid are placed on a filter and the liquid is removed by suction to a degree of practical necessity as desired.

(d) The wet salt is placed in a crucible and the temperature is raised slowly to about 950° C. whereupon the eutectic compound vaporizes and is lost. The temperature is held at 950° C. until of all of the excess acid-water eutectic is substantially lost from the crucible containing the magnesium phosphate salt, whereupon the temperature is raised to about 1100° C. to obtain a homogeneous melt. This melt is then processed further as given in Examples I–III.

(e) If it is desired to obtain crystals free from excess $H_3PO_4$ the magnesium phosphate salt can be washed by suspension and decantation in methyl ethyl ketone. The salt is then processed as before.

EXAMPLE VII — Beryllium Phosphate Glass (a) The procedures of Example VI are followed except that 56.03 gram $BeCO_3.Be(OH)_2$ are substituted for the $MgCO_3$.

(b) Since beryllium is known to be a toxic element, proper precautions regarding prevention of ingestion by humans are maintained. Once the beryllium is in the form of phosphate glass, its toxicity is considerably lowered as compared to solution and melt forms encountered during processing to form the glass.

EXAMPLE VIII — Aluminum Phosphate Glass (a) Prepare a $H_3PO_4$ solution by adding 485 ml of 85% $H_3PO_4$ (reagent grade) to 500 ml $H_2O$. Dilute to 1000 ml total volume. This solution may be purified according to methods given in Examples I–III.

(b) Weigh out 78.00 gm $Al(OH)_3$ and dissolve in $H_3PO_4$ solution.

(c) Purify resulting solution by techniques of Examples I–III.

(d) Evaporate to obtain crystals of aluminum monobasic phosphate, according to techniques of Examples I–III.

(e) Since the glassy melt is not obtained much below 1350° C., it is necessary to remove the excess liquid acid by washing techniques. The prefiring schedule of Example VI(d) is preferred except that the final temperature to obtain a melt is 1350° C. instead of 1100° C.

(f) The substantially homogeneous melt is held at 1350° C. for a time required to effect complete intrareaction and polymerization of the melt. The melt is then cast and annealed to form an aluminum phosphate glass with markedly improved properties over that of the prior art.

EXAMPLE IX — Zinc and Cadmium Phosphate Glasses (a) The general technique of Examples I–III are used with the following exceptions:

(b) Select the desired phosphate and substitute one of the following for the $CaCO_3$ of Example I:

| | |
|---|---|
| 81.37 gm | ZnO |
| 172.41 gm | $CdCO_3$ |

Dissolve in the $H_3PO_4$ solution to form a completely homogeneous solution.

(c) In the case of zinc or cadmium solutions, the use of cupferron is recommended as an organic precipitant in place of APC since the latter forms insoluble precipitates with these two ions. Cupferron only partially precipitates these ions and can be used successfully to purify either of these solutions.

(d) Following solution purification, the salts of Cd or Zn are prepared in the manner of Examples I–III.

(e) The crystals of Cd or Zn monobasic phosphates cannot be washed in acetone since they are soluble therein, but methyl ethyl ketone can be used successfully to remove the excess acid to obtain a purified salt, as described in Examples I–III.

(f) The glasses are prepared as given in Examples I–III, except that the temperatures critical for Cd, or Zn, monobasic salts, as predetermined by differential thermal analysis, are employed.

Although I have described but a limited number of products and methods for preparation according to the present invention, it will be apparent to those skilled in the art that variations in both compositions and methods may be effected within the spirit of the invention. Accordingly, the invention is not to be limited except as required as requied by the appended claims.

I claim:

1. A method of preparing a polymeric phosphate glass having the formula:

$$[M(PO_3)_b]_n$$

where M is a single metal ion, to the exclusion of other metal ions, selected from the group consisting of aluminum, zinc, cadmium and the alkaline earth metals, beryllium, magnesium, calcium, strontium and barium, where "b" is 3 for aluminum and 2 for the other metal ions, and "n" is a degree of polymerization of at least 4, which comprises forming a solution of said metal ion M and phosphoric acid by dissolving a compound supplying said metal ion M in a controlled excess of phosphoric acid to form a stoichiometrically proportioned solution, adding a precipitating agent effective to precipitate soluble transition metal impurities other than the selected metal ion, removing formed insolubles to produce an essentially pure solution, forming a crystal product from the resulting purified solution by evaporation, washing said crystal product substantially free of phosphoric acid to yield a stoichiometrically proportioned crystalline phosphate salt, heating said crystalline salt in a controlled heating cycle in the substantial absence of phosphoric acid or other phosphate or metal ion compounds until a polymerized melt stage is attained, and continuing the polymerization until polymerization is substantially complete and a homogeneous glass is formed.

2. The method of claim 1 wherein M is calcium.
3. The method of claim 1 wherein M is strontium.
4. The method of claim 1 wherein M is barium.
5. The method of claim 1 wherein M is magnesium.
6. The method of claim 1 wherein M is beryllium.
7. The method of claim 1 wherein M is aluminum.
8. The method of claim 1 wherein M is zinc.
9. The method of claim 1 wherein M is cadmium.
10. The method of claim 1 wherein the ratio of metal ion to phosphate group in the homogeneous glass from the melt is about 1:2.
11. The method of claim 1 wherein the heating is intercoupled at the stage where an initial polymerization product has formed and then cooling the compound prior to producing said melt.
12. The method of claim 1 in which the controlled heating cycle comprises a sequence of progressively increasing heating cycles to the melt polymerization stage.

* * * * *